United States Patent
Wang et al.

(10) Patent No.: US 8,628,893 B2
(45) Date of Patent: Jan. 14, 2014

(54) BINDER COMPOSITIONS AND MEMBRANE ELECTRODE ASSEMBLIES EMPLOYING THE SAME

(75) Inventors: Tsung-Hsiung Wang, Dali (TW); Jing-Pin Pan, Hsinchu Hsien (TW); Ssu-Tai Lin, Nantou County (TW)

(73) Assignee: Industrial Technology Research Institute (TW)

( * ) Notice: Subject to any disclaimer, the term of this patent is extended or adjusted under 35 U.S.C. 154(b) by 644 days.

(21) Appl. No.: 12/506,402

(22) Filed: Jul. 21, 2009

(65) Prior Publication Data

US 2010/0143767 A1     Jun. 10, 2010

(30) Foreign Application Priority Data

Dec. 8, 2008 (TW) ................................ 97147619 A

(51) Int. Cl.
*H01M 8/10* (2006.01)
*H01B 1/00* (2006.01)

(52) U.S. Cl.
USPC ........... 429/483; 429/492; 429/507; 252/500; 252/510

(58) Field of Classification Search
USPC ......... 429/483, 492, 493, 494, 482, 507, 509, 429/491; 252/500, 510, 519.33; 525/417
See application file for complete search history.

(56) References Cited

U.S. PATENT DOCUMENTS

| | | | | |
|---|---|---|---|---|
| 6,432,613 | B1 * | 8/2002 | Chen et al. | 430/280.1 |
| 2005/0008920 | A1 | 1/2005 | Kohyama et al. | |
| 2005/0244696 | A1 * | 11/2005 | Kuromatsu et al. | 429/33 |

FOREIGN PATENT DOCUMENTS

TW     200828658     7/2007

OTHER PUBLICATIONS

Office Action from corresponding application No. 097147619.

* cited by examiner

*Primary Examiner* — Raymond Alejandro
(74) *Attorney, Agent, or Firm* — Lowe Hauptman & Ham, LLP

(57) ABSTRACT

Binder composites for membrane electrode assemblies and membrane electrode assemblies employing the same are provided. The binder composition includes a solvent, a hyper-branched polymer and a polymer with high ion conductivity, wherein the hyper-branched polymer and the polymer with high conductivity of hydronium are distributed uniformly over the solvent, and the hyper-branched polymer has a DB (degree of branching) of more than 0.5.

15 Claims, 5 Drawing Sheets

US 8,628,893 B2

BINDER COMPOSITIONS AND MEMBRANE ELECTRODE ASSEMBLIES EMPLOYING THE SAME

CROSS REFERENCE TO RELATED APPLICATIONS

This application is based upon and claims the benefit of priority from the prior Taiwan Patent Application No. 97147619, filed on Dec. 8, 2008, the entire contents of which are incorporated herein by reference.

BACKGROUND OF THE INVENTION

1. Field of the Invention

The invention relates to a binder composition and membrane electrode assemblies employing the same, and more particularly to a binder composition for high temperature conductivity and membrane electrode assemblies employing the same.

2. Description of the Related Art

Fuel cells are well known and are commonly used to produce electrical energy by means of electrochemical reactions. Compared to conventional power generation apparatuses, fuel cells have advantages of causing less pollution, generating less noise, increased energy density and higher energy conversion efficiency. Fuel cells can be used in portable electronic products, home-use or plant-use power generation systems, transportation vehicles, military equipment, space industry application, large-sized power generation systems, etc.

For example, in the case of a proton exchange membrane fuel cell (PEMFC), hydrogen is supplied to an anode and an oxidation reaction occurs in the presence of an anode catalyst layer, thus protons and electrons are generated. The protons reach the cathode through the proton exchange membrane. Meanwhile, in the cathode, electrons from the anode via the external circuit are reduced to oxygen supplied to the cathode and protons by reduction, producing water.

FIG. 1A shows an exploded view of conventional fuel cell 10 with a membrane electrode assembly, and FIG. 1B shows a cross-section view of FIG. 1A. As shown in FIGS. 1A and 1B, the conventional fuel cell 10 can comprise a membrane electrode assembly 12 comprising a catalytic anode film 121, a proton exchange membrane 122, and a catalytic cathode film 123, wherein a binder composition 124 can be used to combine the catalytic anode film 121 and the proton exchange membrane 122, and/or the catalytic cathode film 123 and the proton exchange membrane 122. The conventional fuel cell 10 further comprises a bipolar plate 13 and two end electrode plates 11 for connection, wherein the bipolar plate 13 and the end electrode plates 11 comprises gas passages 111 and 131 for conducting hydrogen and oxygen into the membrane electrode assembly 12.

In general, conventional binder compositions employed by membrane electrode assemblies comprise NAFION (manufactured by E. I. Du Pont de Nemours & Co.) as main component. The NAFION has adequate physical properties, chemical properties, and proton conductivity, but some deficiencies exist when used as a main component of binder compositions. NAFION refers to a sulfonated tetrafluoroethylene copolymer.

To begin, the NAFION-based binder composition exhibits swelling deformation in the present of aqueous solvent, resulting in difficulties for precision control during coating processes.

Further, under relatively high temperatures (>80° C.), NAFION is apt to softening and may be further induced to change phases, resulting in reduction of proton mobility efficiency. Additionally, under relatively low temperatures (<80° C.), the NAFION exhibits inferior CO tolerance, resulting in reduction of catalyst efficiency and decrease of the operating lifespan of fuel cells.

Moreover, for NAFION-based binder compositions, required water management is difficult to control. Inefficient water management may lead to an anode becoming prone to drying and the cathode to flooding, resulting in oxygen not being able to contact the surface of the catalyst, thus limiting proton transport.

Additionally, when operating in a temperature of more than 100° C., NAFION-based binder compositions exhibit inferior proton mobility, thus, structural deterioration may occur due to the poor water retention coefficient thereof.

Accordingly, a novel binder composition for membrane electrode assemblies to replace conventional NAFION-based binder compositions is required.

BRIEF SUMMARY OF THE INVENTION

An exemplary embodiment of a binder composition for a membrane electrode assembly includes a solvent. A hyper-branched polymer and a polymer with high ion conductivity are distributed uniformly over the solvent, wherein the hyper-branched polymer has a DB (degree of branching) of more than 0.5.

In an embodiment of the invention, the hyper-branched polymer comprises a polymer prepared by polymerizing a bismaleimide-containing compound with a barbituric acid.

An exemplary embodiment of a membrane electrode assembly includes a catalytic anode and a catalytic cathode. A proton exchange membrane is disposed between the catalytic anode and the catalytic cathode. An adhesive layer is formed for binding the catalytic anode to the proton exchange membrane and the catalytic cathode to the proton exchange membrane, wherein the adhesive layer comprises the aforementioned binder composition of the invention. In embodiments of the invention, the membrane electrode assembly can be applied in fuel cells, Li-ion cells, or biocells.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
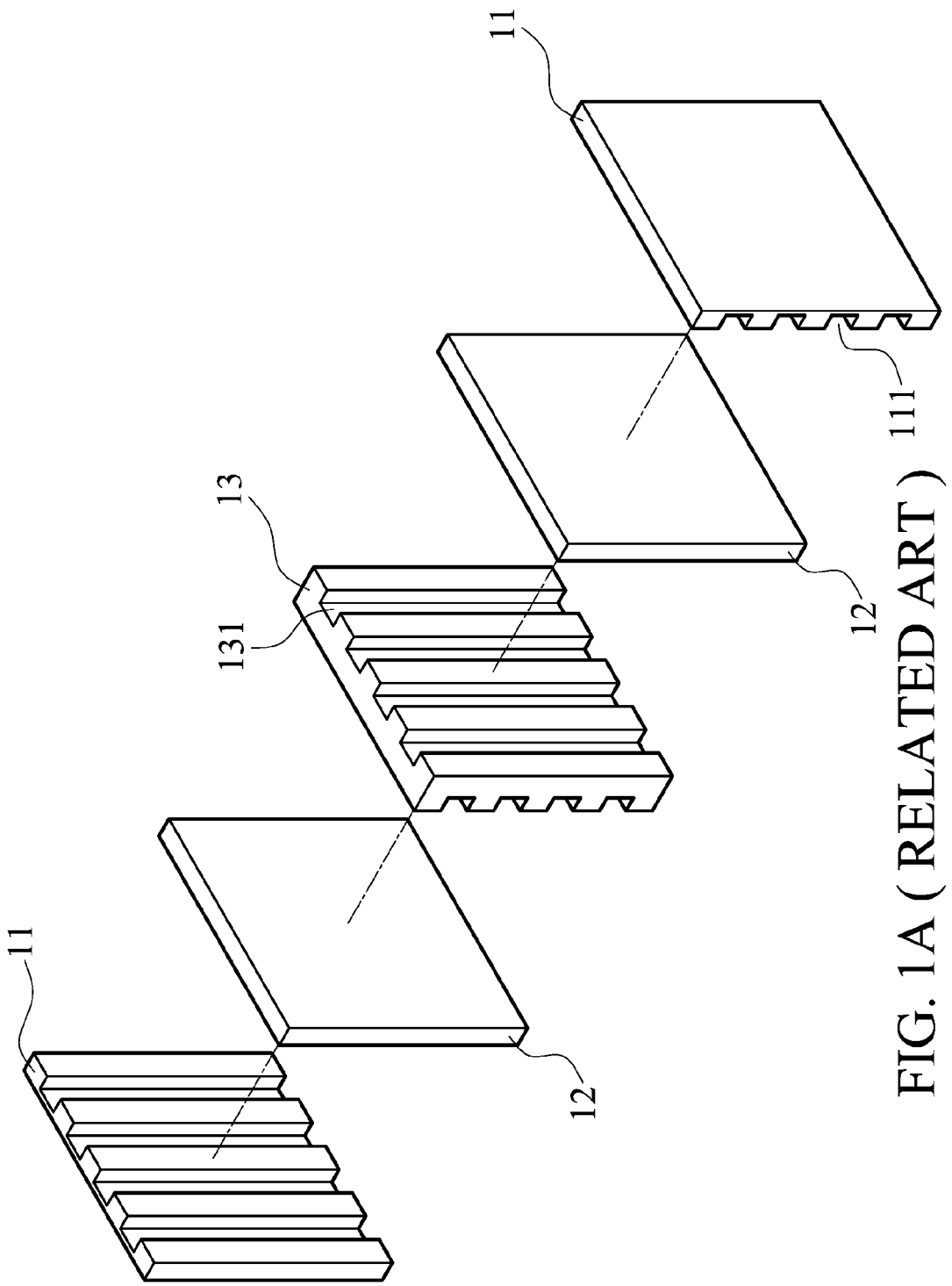
FIG. 1A is an exploded view of a conventional fuel cell with a membrane electrode assembly.
Figure 1B:
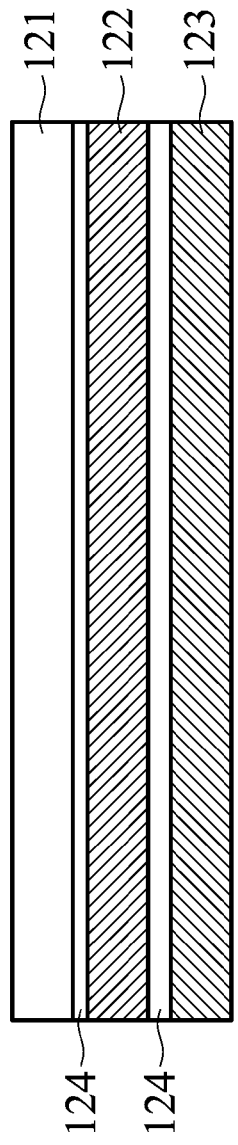
FIG. 1B is a cross section of the conventional fuel cell with a membrane electrode assembly as shown in FIG. 1A.

The following description is of the best-contemplated mode of carrying out the invention. This description is made for the purpose of illustrating the general principles of the invention and should not be taken in a limiting sense. The scope of the invention is best determined by reference to the appended claims.

The binder composition for membrane electrode assemblies providing by embodiments of the invention comprises a hyper-branched polymer and a polymer with high ion conductivity, wherein the hyper-branched polymer and the polymer with high ion conductivity are distributed uniformly over a solvent.

The hyper-branched polymer according to the invention has a degree of branching (DB) of more than 0.5. The degree of branching (DB) is defined as the average fraction of branching groups per molecule, i.e., the ratio of terminal groups plus branched groups to the total number of terminal groups, branched groups, and linear groups. The degree of branching is expressed mathematically as follows:

$$DB=(\Sigma D+\Sigma T)/(\Sigma D+\Sigma L+\Sigma T)$$

where D represents the number of dendritic units (comprising at least three linkage bonds), L represents the number of linear units, and T represents the number of terminal units, as defined in Hawker, C. J.; Lee, R. Frchet, J. M. J., J. Am. Chem. Soc., 1991, 113, 4583.

In embodiments of the invention, the hyper-branched polymer comprises the STOBA (self-terminated oligomer with hyper-branched architecture), such as polymers prepared by polymerizing a bismaleimide-containing compound with a barbituric acid.

The bismaleimide-containing compound comprises substituted or unsubstituted bismaleimide monomer or substituted or unsubstituted bismaleimide oligomer. For examples, the bismaleimide-containing compound can be laryl group, heteroaryl group, arylalkyl group, or combinations thereof. Further, the bismaleimide-containing compound can comprise

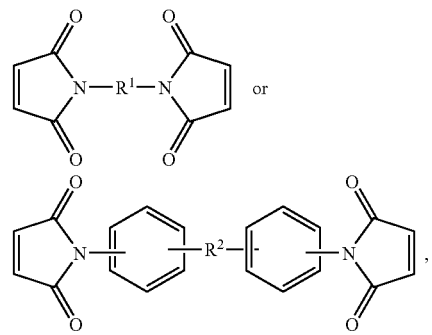

wherein $R^1$ may comprise —$RCH_2$— (alkyl), —$RNH_2R$—, —C(O)$CH_2$—, —$CH_2OCH_2$—, —C(O)—, —O—, —O—O—, —S—, —S—S—, —S(O)—, —$CH_2S(O)CH_2$—, —(O)S(O)—, —$C_6H_4$—, —$CH_2(C_6H_4)CH_2$—, —$CH_2(C_6H_4)(O)$—, phenylene, diphenylene, substituted phenylene or substituted diphenylene, $R^2$ comprises —$RCH_2$—, —C(O)—, —$C(CH_3)_2$—, —O—, —O—O—, —S—, —S—S—, —(O)S(O)— or —S(O)—. R may independently comprise hydrogen or $C_1$-$C_4$ alkyl. The bismaleimide-containing compound may be selected from the group consisting of N,N'-bismaleimide-4,4'-diphenylmethane, [1,1'-(methylenedi-4,1-phenylene)bismaleimide], [N,N'-(1,

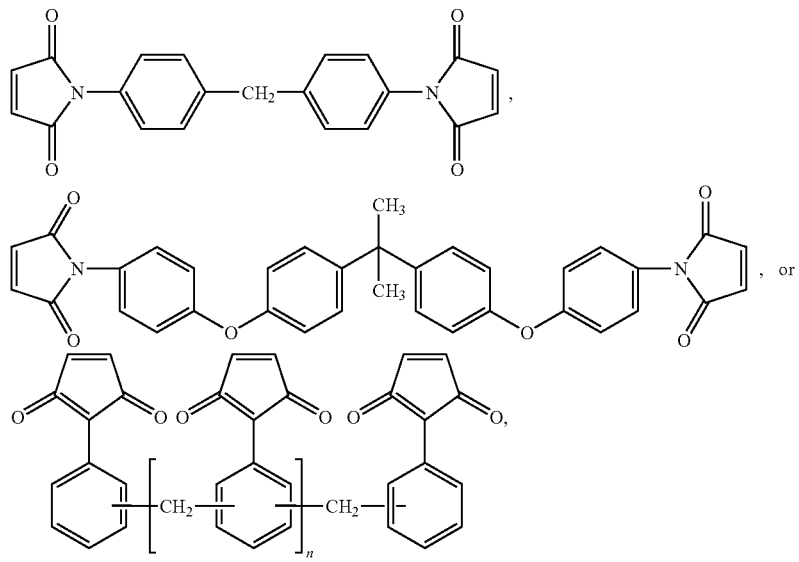

wherein n>1. In addition, at least one hydrogen atom bonded to the carbon atom of the aforementioned bismaleimide-containing compounds can be substituted optionally by fluorine, halogen atom, cyano group, —R", —$CO_2H$, —$CO_2R$", —COR", —R"CN, —$CONH_2$, —CONHR", —$CONR"_2$, —OCOR" or OR, wherein R" can be selected from the group consisting of substituted or unsubstituted $C_1$-$C_{12}$ alkyl group, thioalkyl group, alkynyloxy group, alkoxy group, alkenyl group, alkynylene group, alkenyloxy group, aryl group, alky- 1'-biphenyl-4,4'-diyl)bismaleimide], [N,N'-(4-methyl-1,3-phenylene)bismaleimide], [1,1'-(3,3' dimethyl-1,1'-biphenyl-4,4'-diyl)bismaleimide], N,N'-ethylenedimaleimide, [N,N'-(1,2-phenylene)dimaleimide], [N,N'-(1,3-phenylene) dimaleimide], N,N'-thiodimaleimide, N,N'-dithiodimaleimide, N,N'-ketonedimaleimide, N,N'-methylene-bis-maleinimide, bis-maleinimidomethyl-ether, [1,2-bis-(maleimido)-1,2-ethandiol], N,N'-4,4'-diphenylether-bis-maleimid and [4,4'-bis(maleimido)-diphenylsulfone].

Further, the barbituric acid can be, or, wherein $R_1$, $R_2$, $R_3$ and

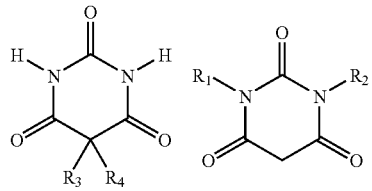

$R_4$ may be the same or different and comprise H, $CH_3$, $C_2H_5$, $C_6H_5$, $CH(CH_3)_2$, $CH_2CH(CH_3)_2$, $CH_2CH_2CH(CH_3)_2$, or

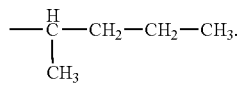

STOBA (self-terminated oligomer with hyper-branched architecture) can be prepared by polymerizing a bismaleimide-containing compound with a barbituric acid or its derivatives in solvent systems. In particular, the molar ratio of the bismaleimide-containing compound and barbituric acid can be 20:1 to 1:5, preferably 5:1 to 1:2.

According to the present invention, the at least one initiator employed is an agent, such as peroxide initiators or azo initiators, which generates, upon activation, free radical species through decomposition, and can be 2,2'-azobis(2-cyano-2-butane), dimethyl 2,2'-azobis(methyl isobutyrate), 4,4'-azobis(4-cyanopentanoic acid), 4,4'-azobis(4-cyanopentan-1-ol), 1,1'-azobis(cyclohexanecarbonitrile), 2-(t-butylazo)-2-cyanopropane, 2,2'-azobis[2-methyl-(N)-(1,1)-bis(hydroxymethyl)-2-hydroxyethyl]propionamide, 2,2'-azobis[2-methyl-N-hydroxyethyl)]propionamide, 2,2'-azobis(N,N'-dimethyleneisobutyramidine) dihydrochloride, 2,2'-azobis(2-amidinopropane) dihydrochloride, 2,2'-azobis(N,N'-dimethyleneisobutyramine), 2,2'-azobis(2-methyl-N-[1,1-bis(hydroxymethyl)-2-hydroxyethyl]propionamide, 2,2'-azobis(2-methyl-N-[1,1-bis(hydroxymethyl)ethyl] propionamide), 2,2'-azobis[2-methyl-N-(2-hydroxyethyl) propionamide], 2,2'-azobis(isobutyramide)dihydrate, 2,2'-azobis(2,2,4-trimethylpentane), 2,2'-azobis(2-methylpropane), dilauroyl peroxide, tertiary amyl peroxides, tertiary amyl peroxydicarbonates, t-butyl peroxyacetate, t-butyl peroxybenzoate, t-butyl peroxyoctoate, t-butyl peroxyneodecanoate, t-butylperoxy isobutyrate, t-amyl peroxypivalate, t-butyl peroxypivalate, di-isopropyl peroxydicarbonate, dicyclohexyl peroxydicarbonate, dicumyl peroxide, dibenzoyl peroxide, potassium peroxydisulfate, ammonium peroxydisulfate, di-tert butyl peroxide, di-t-butyl hyponitrite, dicumyl hyponitrite or combinations thereof.

In embodiments of the invention, the polymer with high ion conductivity can be NAFION, sulfonated poly(ether ether ketone)(s-PEEK), sulfonated polyimides (s-PI), phosphoric acid/polybenzimidazole polymer (p-PBI), sulfonated poly (phenylene oxide) (s-PPO), sulfonated poly(arylene ether sulfone) (s-PES), sulfonated poly(4-phenoxybenzoyl-1,4-phenylene) (s-PPBP), or combinations thereof.

The solvent used in the invention can be γ-butyrolactone (GBL), 1-methyl-2-pyrrolidinone (NMP), dimethylacetamide (DMAC), N,N-dimethylformamide (DMF), dimethyl sulfoxide (DMSO), dimethylamine (DMA), tetrahydrofuran (THF), methyl ethyl ketone (MEK), propylene carbonate (PC), water, isopropyl alcohol (WA), or combinations thereof.

It should be noted that the hyper-branched polymer can be in an amount of 5-30 parts by weight, preferably 10-25 parts by weight, based on 100 parts by weight of the hyper-branched polymer and the polymer with high ion conductivity.

Moreover, in embodiments of the invention, the binder composition for a membrane electrode assembly can further comprise a conductive material, wherein the conductive material can comprise organic conductive material, organic-inorganic conductive material, inorganic conductive material, metal material, organic-metal material, or inorganic-metal material, such as carbonaceous material (VULCAN XC-72, a carbon black, for example), lithium-cobalt oxide, lithium-manganese oxide, lithium-nickel oxide, lithium-cobalt-nickel oxide, lithium-cobalt-nickel-manganese oxide, or lithium-iron-phosphorus oxide. In some embodiments of the invention, the binder composition for a membrane electrode assembly can further comprise a catalyst, wherein the catalyst comprises platinum, ruthenium, platinum-ruthenium alloy, platinum-tin alloy, platinum-tungsten alloy, or platinum-molybdenum alloy.

Figure 2A:
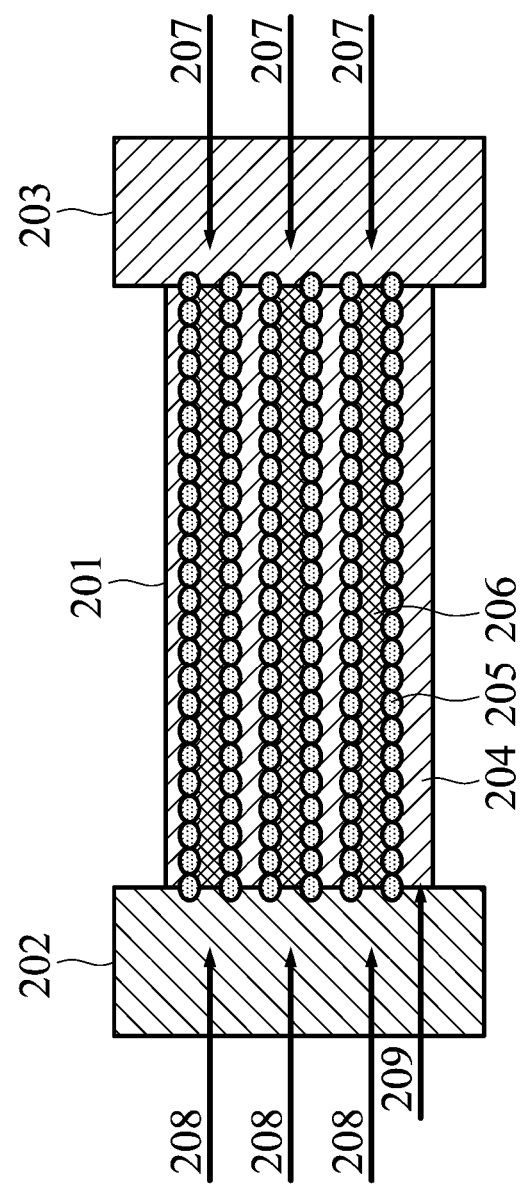
FIGS. 2A and 2B are partial schematic drawing of membrane electrode assemblies with the adhesive layer made of the binder composition according to embodiments of the invention.
Figure 2B:
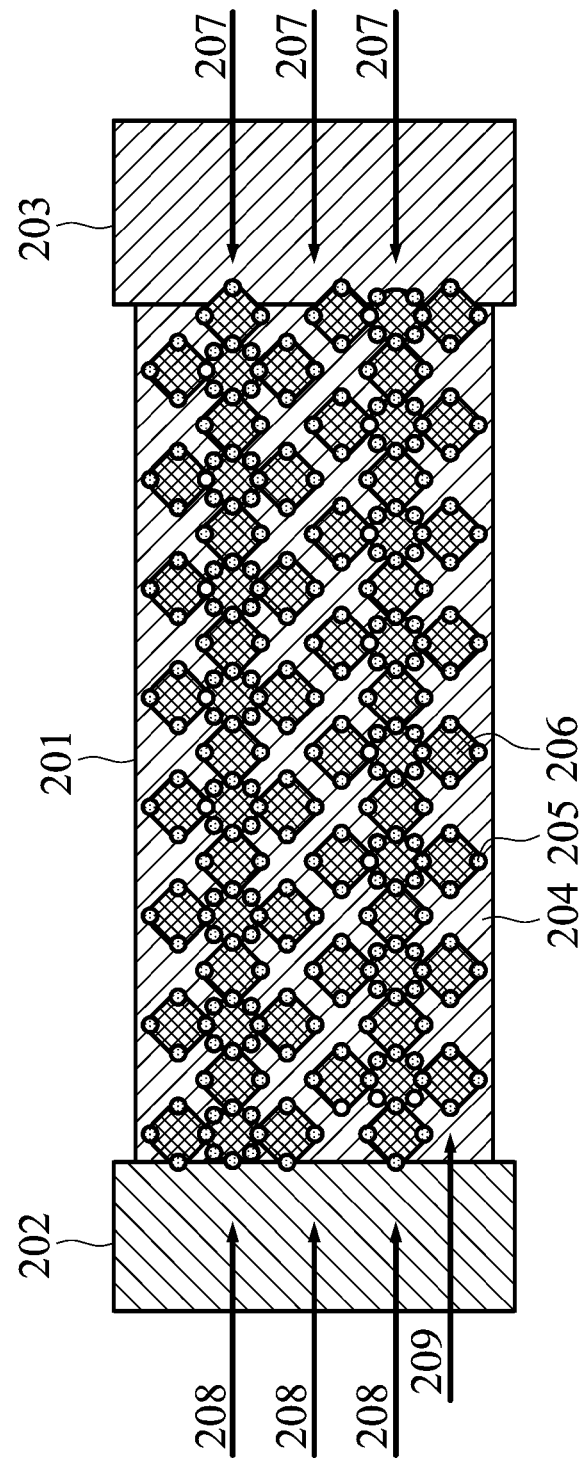

Referring to FIGS. 2a and 2b, an adhesive layer 201, consisting of the aforementioned binder composition, binds each electrode 202 to a proton exchange membrane 203. The hyper-branched polymer and the polymer with high ion conductivity of the binder composition comprise the main configuration 204 of the adhesive layer 201, and the conductive material 205 and the catalyst 206 of the binder composition further blended, adhered, distributed, and/or mounted with the hyper-branched polymer and the polymer with high ion conductivity to build a linear-like structure (as shown in FIG. 2a) or a network-like structure (as shown in FIG. 2b). Therefore, the adhesive layer 201 exhibits air conduction, proton conduction, electricity conduction, and water conduction due to characteristic channels thereof, increasing the efficiency of the cell.

For example, hydrogen gas reacts with the catalyst adhered on the carbonaceous material of the adhesive layer 201 to produce protons 207, as shown in following reaction formula:

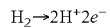

$$H_2 \rightarrow 2H^+ 2e^-$$

The protons 207 move into the channels of the adhesive layer 201 via the proton exchange membrane 203, the electrons 208 move into the channels of the adhesive layer 201 via cathode 202, and incoming oxygen gas 209 reacts with the protons 207 and the electrons 208 via the channels of the adhesive layer 201, producing water. The reaction formula is shown below:

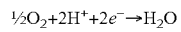

$$\tfrac{1}{2}O_2 + 2H^+ + 2e^- \rightarrow H_2O$$

Accordingly, the structure with a proton channel, provided by the STOBA (as main component) and the polymer with high ion conductivity (such as NAFION, sulfonated poly (ether ether ketone)(s-PEEK), sulfonated polyimides (s-PI), phosphoric acid/polybenzimidazole polymer (p-PBI), sulfonated poly(phenylene oxide) (s-PPO), sulfonated poly (arylene ether sulfone) (s-PES), sulfonated poly(4-phenoxybenzoyl-1,4-phenylene) (s-PPBP), or combinations thereof), exhibits improved water retention ability, chemical resistance, mechanical strength, thermal resistance, flexibility, and proton conductivity, and prevents acid from leaking out.

Figure 3:
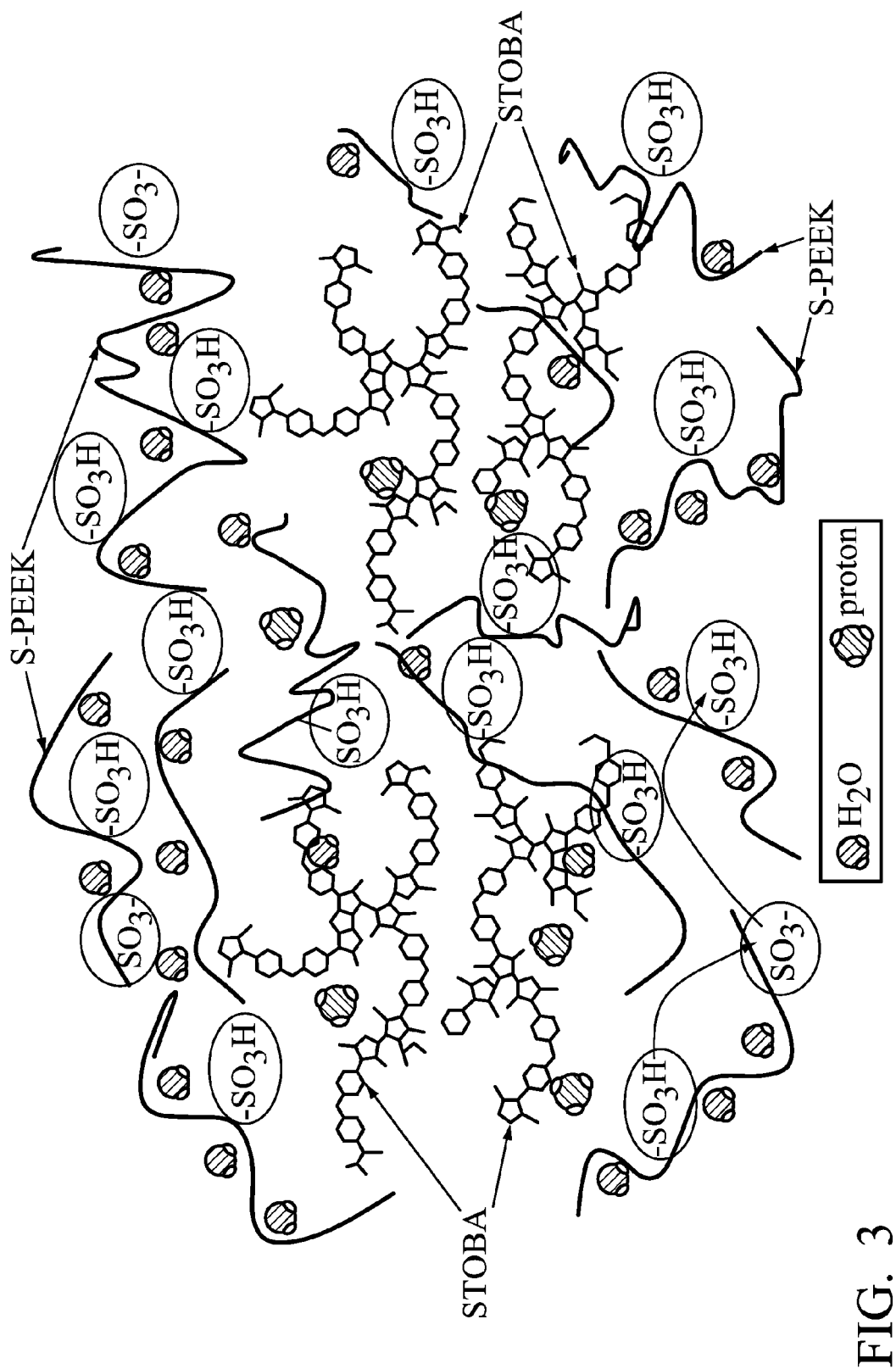
FIG. 3 is a partial schematic drawing of the main configuration of the adhesive layers disclosed in the membrane electrode assemblies of FIG. 2A or FIG. 2B.

FIG. 3 is a partial schematic drawing of the main configuration 204, illustrating the conduction mechanism of water molecules and protons within the hyper-branched polymer (such as the STOBA) and the polymer with high ion conductivity (such as the s-PEEK).

The following examples are intended to illustrate the invention more fully without limiting their scope, since numerous modifications and variations will be apparent to those skilled in the art.

Preparation of Hyper-Branched Polymer

Examples 1-3

Bismaleimide-containing compounds, represented by

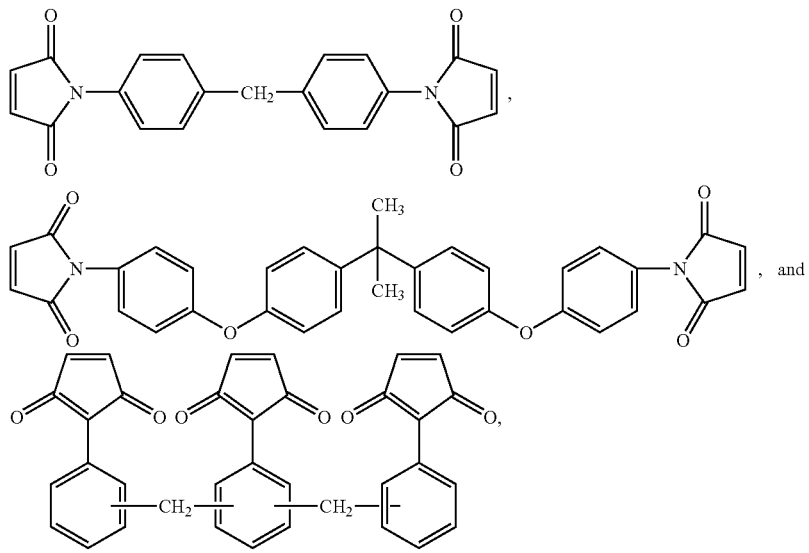

were respectively dissolved in γ-butyrolactone (GBL) and reacted with barbituric acid represented by

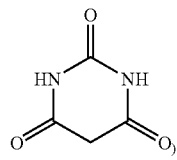

at 130° C. for 6 hr, wherein the molar ratio of the bismaleimide-containing compound and barbituric acid was 2:1 (with a solid content of 20 wt %). By filtration and drying, hyper-branched polymers (A)-(C) with DB of 50% were obtained.

Preparation of Binder Composition for a Membrane Electrode Assembly

Example 4

The hyper-branched polymer (A) (having a solid content of 20 wt %, dissolved in GBL) was mixed with the s-PEEK (having a solid content of 20 wt % and a degree of sulfonation of 67%, dissolved in NMP). After stirring for 1 hr, the mixture was depressurized at low temperature to expel air bubbles, obtaining the binder composition (A), wherein the weight ratio of the hyper-branched polymer (A) and the s-PEEK was 15:85.

Example 5

The hyper-branched polymer (A) (having a solid content of 20 wt %, dissolved in GBL) was mixed with the s-PI (having a solid content of 3 wt %, dissolved in meta-cresol). After stirring for 1 hr, the mixture was depressurized at low temperature to expel air bubbles, obtaining the binder composition (B), wherein the weight ratio of the hyper-branched polymer (A) and the s-PI was 18:82.

Example 6

The hyper-branched polymer (A) (having a solid content of 20 wt %, dissolved in GBL) was mixed with NAFION 2020 (sold and manufactured by E. I. Du Pont de Nemours & Co.). After stirring for 1 hr, the mixture was left undisturbed for 5 days, obtaining the binder composition (C), wherein the weight ratio of the hyper-branched polymer (A) and NAFION 2020 was 10:90.

Characteristic Measurements of Adhesive Layers Comprising the Binder Composition The binder compositions (A) and (B) were respectively coated on a glass substrate and subjected to a baking process. For the baking process, the coating was sequentially baked at 80° C. for 30 minutes, 100° C. for 60 minutes, and 130° C. for 120 minutes. After cooling, the coatings were stripped from the glass substrate, respectively obtaining adhesive layers (A) and (B) with a thickness of 25 um.

The water retention ability of the adhesive layer (A) (comprising the STOBA-SPEEK) was measured via TGA (therapeutic goods administration) and the results are shown in

TABLE 1

| water retention contributions of the STOBA-SPEEK and moieties thereof per unit weight | | | | |
|---|---|---|---|---|
| | STOBA | —SO$_3$H | PEEK | BMI |
| free water (<100° C.) | 0.1904 | 5.7614 | −0.5438 | −1.8956 |
| bound water (100~200) | 0.1429 | −0.4771 | 0.0960 | −0.0568 | per unit weight

Note that the water retention contributions measured below 100° C. was defined as the weight of free water, and the water retention contributions measured between 100-200° C. was defined as the weight of bound water As shown in Table. 1, the STOBA exhibited superior water retention ability higher than —SO$_3$H, PEEK, and BMI (bis-maleimide monomer) due to an intramolecular hydrogen bond formation between the STOBA and water. Therefore, the membrane electrode assembly employing the binder composition can be operated at higher temperatures in order to increase efficiency.

The mechanical strength of the adhesive layer (A), the adhesive layer (B), the NAFION 112 film, the s-PEEK film, and the s-PI film were measured and the results are shown in Table 2.

TABLE 2

| | Nafion 112 | s-PEEK | adhesive layer (A) (STOBA:s-PEEK = 20:80) | s-PI | adhesive layer (B) (STOBA:s-PI = 18:82) |
|---|---|---|---|---|---|
| thickness (μm) | 54 | 25 | 42 | 26 | 26 |
| tensile strength (Kgf/mm$^2$) | 2.25 | 4.94 | 5.87 | 2.69 | 4.22 |
| extension (%) | 103.3 | 5.48 | 5.28 | 5.00 | 6.37 |

As shown in Table 2, the adhesive layers (A) and (B) exhibited superior tensile strength and extension than the s-PEEK or the s-PI resulting from the addition of the STOBA. Therefore, the membrane electrode assembly employing the binder composition had increased mechanical strength.

The mechanical strength of the adhesive layer (A), the adhesive layer (B), the NAFION 112 film, the s-PEEK film, and the s-PI film were immersed in boiling water (100° C.) for 120 minutes. After cooling, the dimensional changes thereof were measured and the results are shown in Table 3.

TABLE 3

| | Nafion 112 | s-PEEK | adhesive layer (A) (STOBA:s-PEEK = 20:80) | s-PI | adhesive layer (B) (STOBA:s-PI = 18:82) |
|---|---|---|---|---|---|
| ΔL | 17% | X | 5% | 2.5% | 3.75% |
| ΔW | 3% | X | 10% | 12% | 0% |
| ΔT | 12% | X | 19% | 53.9% | 4.5% |
| property changes | softening | dissolution | — | brittlement | — |

Note that ΔL represented the dimensional change in length; ΔW represented the dimensional change in width; and ΔT represented the dimensional change in thickness.

As shown in Table 3, the adhesive layers (A) and (B) exhibited superior dimensional stability and overcame the brittlement problems of the s-PI or the s-PEEK.

Measurement of Warpage and Adhesion

The binder composition (C) was respectively coated on one side surface of first and second gas diffusion layers (carbon paper) and two side surfaces of a proton exchange membrane (comprising the STOBA, the s-PEEK, and the s-PI). Next, the proton exchange membrane and the second gas diffusion layer were sequentially disposed on the first gas diffusion layer. After hot rolling, the above structure was respectively baked at 70° C. and 130° C. for 15 minutes, obtaining a membrane electrode assembly.

Next, the membrane electrode assemblies were respectively immersed in water at 25° C. for 15 hrs and at 100° C. for 1.5 hrs. After removal from water, the membrane electrode assemblies were observed to contain no warpage or peeling.

Accordingly, the adhesive layers made of the binder composition of the invention (STOBA & the s-PEEK or the STOBA & the s-PI) exhibited higher water retention ability, and mechanical strength than the layers consisting of the s-PEEK or the s-PI. Further, the adhesive layers made of the binder composition of the invention exhibited high dimensional stability when immersed in boiling water due to the main component the STOBA. Therefore, the adhesive layers made of the binder composition of the invention exhibited minimal swelling and brittleness even when exposed to 100° C. and 100% RH.

Moreover, in comparison with conventional NAFION 112, the adhesive layers made of the binder composition of the invention exhibit higher water retention ability and mechanical strength and did not softened or become brittle. The adhesive layers of the invention had an electrical conductivity of $1 \times 10^{-2} \sim 5 \times 10^{-2}$ S/cm at 25° C. similar to the NAFION film, and had an electrical conductivity of $1 \times 10^{-1} \sim 5 \times 10^{-1}$ S/cm at 120° C.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A binder composition for a membrane electrode assembly, comprising
   a solvent;
   a hyper-branched polymer, wherein the hyper-branched polymer has a degree of branching of more than 0.5; and
   a polymer with high ion conductivity, wherein the hyper-branched polymer and the polymer with high ion conductivity are distributed uniformly over the solvent, wherein the hyper-branched polymer comprises a polymer prepared by polymerizing a bismaleimide-containing compound with a barbituric acid, and wherein the hyper-branched polymer is in an amount of 5-30 parts by weight, based on 100 parts by weight of the hyper-branched polymer and the polymer with high ion conductivity.

2. The binder composition as claimed in claim 1, wherein the molar ratio of the bismaleimide-containing compound and barbituric acid is 20:1 to 1:5.

3. The binder composition as claimed in claim 1, wherein the molar ratio of the bismaleimide-containing compound and barbituric acid is 5:1 to 1:2.

4. The binder composition as claimed in claim 1, wherein the bismaleimide-containing compound comprises substituted or unsubstituted bismaleimide monomer or substituted or unsubstituted bismaleimide oligomer.

5. The binder composition as claimed in claim 1, wherein the bismaleimide-containing compound comprises

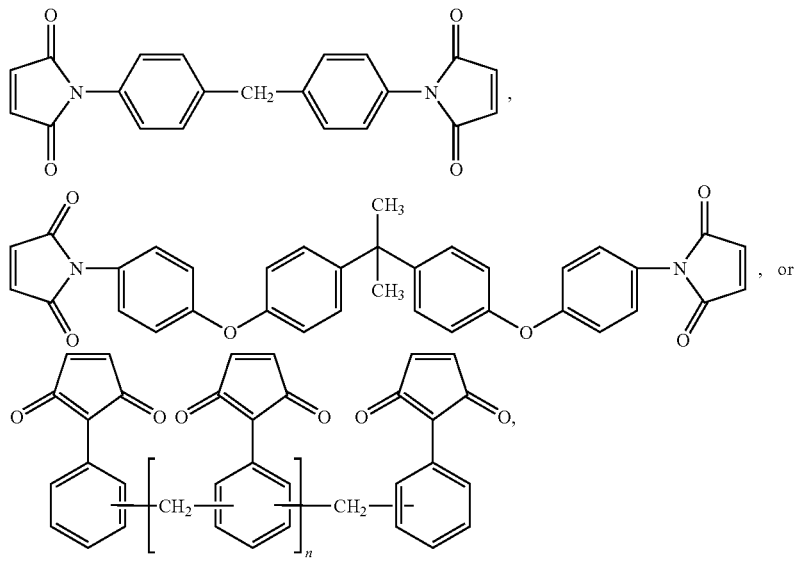

wherein n>1.

6. The binder composition as claimed in claim 1, wherein the hyper-branched polymer is in an amount of 10-25 parts by weight, based on 100 parts by weight of the hyper-branched polymer and the polymer with high ion conductivity.

7. The binder composition as claimed in claim 1, wherein the polymer with high ion conductivity comprises sulfonated tetrafluorethylene copolymer, sulfonated poly(ether ether ketone), sulfonated polyimides, phosphoric acid/polybenzimidazole polymer, sulfonated poly(phenylene oxide), sulfonated poly(arylene ether sulfone), or sulfonated poly(4-phenoxybenzoyl-1,4-phenylene).

8. The binder composition as claimed in claim 1, wherein the solvent comprises γ-butyrolactone, 1-methyl-2-pyrrolidinone, dimethylacetamide, N,N-dimethylformamide, dimethyl sulfoxide, dimethylamine, tetrahydrofuran, methyl ethyl ketone, propylene carbonate, water, isopropyl alcohol, or combinations thereof.

9. The binder composition as claimed in claim 1, further comprising a conductive material.

10. The binder composition as claimed in claim 9, wherein the conductive material comprises organic conductive material, organic-inorganic conductive material, inorganic conductive material, metal material, organic-metal material, or inorganic-metal material.

11. The binder composition as claimed in claim 9, wherein the conductive material comprises carbonaceous material, lithium-cobalt oxide, lithium-manganese oxide, lithium-nickel oxide, lithium-cobalt-nickel oxide, lithium-cobalt-nickel-manganese oxide, or lithium-iron-phosphorus oxide.

12. The binder composition as claimed in claim 1, further comprising a catalyst.

13. The binder composition as claimed in claim 12, wherein the catalyst comprises platinum, ruthenium, platinum-ruthenium alloy, platinum-tin alloy, platinum-tungsten alloy, or platinum-molybdenum alloy.

14. A membrane electrode assembly, comprising:
a catalytic anode;
a catalytic cathode;
a proton exchange membrane disposed between the catalytic anode and the catalytic cathode; and
an adhesive layer for binding the catalytic anode to the proton exchange membrane and the catalytic cathode to the proton exchange membrane, wherein the adhesive layer comprises the binder composition as claimed in claim 1.

15. The membrane electrode assembly as claimed in claim 14, wherein the membrane electrode assembly is applied in fuel cells, Li-ion cells, or biocells.

* * * * *